United States Patent
Ferguson

(10) Patent No.: US 6,961,798 B2
(45) Date of Patent: Nov. 1, 2005

(54) KVM EXTENSION CONFIGURATION INCLUDING A USB-TO-NON-USB ADAPTER TO SUPPORT TRANSMISSION OF USB SIGNALS FROM A HOST TO KVM DEVICES LOCATED OUTSIDE OF USB OPERATING RANGES

(75) Inventor: Patrick Lee Ferguson, Cypress, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 250 days.

(21) Appl. No.: 10/410,534

(22) Filed: Apr. 9, 2003

(65) Prior Publication Data

US 2003/0212842 A1 Nov. 13, 2003

Related U.S. Application Data

(63) Continuation-in-part of application No. 10/109,087, filed on Mar. 28, 2002.

(51) Int. Cl.[7] .......................... G06F 13/12; G06F 13/42
(52) U.S. Cl. .......................... 710/305; 710/63; 710/105; 710/313; 710/315
(58) Field of Search .......................... 710/63, 73, 305, 710/300, 100, 8, 313, 315, 301–302, 2, 104, 105, 9; 439/55, 61, 377; 361/760–761, 686; 340/825; 709/250; 713/300; 370/257, 906, 490; 385/53; 345/531

(56) References Cited

U.S. PATENT DOCUMENTS 5,828,303 A * 10/1998 Williams .................. 340/545.1
5,967,796 A * 10/1999 Hartfiel et al. ................ 439/61
6,320,756 B1 * 11/2001 Ikeda .......................... 361/760
6,381,666 B1 * 4/2002 Kejser et al. ............... 710/300
6,397,268 B1 * 5/2002 Cepulis ......................... 710/8
6,571,305 B1 * 5/2003 Engler ......................... 710/100
6,671,756 B1 * 12/2003 Thomas et al. ............... 710/73
6,672,896 B1 * 1/2004 Li .............................. 439/502
6,735,658 B1 * 5/2004 Thornton .................... 710/305
6,772,253 B1 * 8/2004 Slaight et al. ............... 710/105

OTHER PUBLICATIONS

"Low loss optical interface on a hybrid silicon motherboard" by Jones, C.A.; Nield, M.W.; Cooper, K.; Rush, J.D. (abstract only).*

"Integrating communication protocol selection with hardware/software codesign" by Knudsen, P.V. and Madsen, J. (abstract only) Publication date: Aug. 1999 Publication Date Oct. 24, 1994.*

* cited by examiner

Primary Examiner—Gopal C. Ray

(57) ABSTRACT

A KVM extension configuration that includes a host connected to a transmitter for transmitting communication signals across an extension to a receiver where user interface devices are located. The host has a motherboard that supports USB communications. A USB adapter may be coupled to the transmitter that converts USB signals that the transmitter receives from the host to a non-USB format prior to transmission across the extension to the receiver where the user interface devices successfully communicate with the host. A transmitter core may be coupled to the transmitter that receives the non-USB signals from the USB adapter and transmits such signals to the receiver.

18 Claims, 7 Drawing Sheets

KVM EXTENSION CONFIGURATION INCLUDING A USB-TO-NON-USB ADAPTER TO SUPPORT TRANSMISSION OF USB SIGNALS FROM A HOST TO KVM DEVICES LOCATED OUTSIDE OF USB OPERATING RANGES

CROSS-REFERENCE TO RELATED APPLICATIONS

The present application is a continuation in part of U.S. application Ser. No. 10/109,087, filed Mar. 28, 2002, and is related to the following U.S. applications which are incorporated by reference herein in their entireties: U.S. application Ser. No. 10/035,757, filed Dec. 31, 2001, entitled "Method Of Connecting To A KVM Transmitter Using Internal Cables" by Ferguson et al.; U.S. application Ser. No. 10/035,778, filed Dec. 31, 2001, entitled "Solution For Integrating A KVM Extension Transmitter With A Graphics Controller On An Add-In Card" by Ferguson et al.; U.S. application Ser. No. 10/109,134, filed Mar. 28, 2002, entitled "Method Of Supporting Audio For KVM Extension In A Server" by Ferguson et al.; and U.S. application Ser. No. 10/109,589, filed Mar. 28, 2002, entitled "Method of Powering On and Off A Computer Using A Standard Keyboard" by Ferguson.

BACKGROUND OF THE INVENTION

Standard computer interfaces such as keyboard, mouse, video, and audio are often referred to as KVM ("keyboard, video, mouse") products. "KVM extension" can be defined as extending the access points for computer user interfaces such as keyboards, mice, monitors, etc., i.e., user interfaces may operate with a host processor although positioned outside the standard operating range for the user interface products. KVM extension products are particularly useful when dealing with rack mounted computer solutions where the computers of the rack are positioned away from the user interface products. However, among other things, today's rack mounted solutions suffer from excessive cabling issues when KVM extension products are introduced.

Fundamental components of computer interface extension solutions include KVM products, an extension receiver, an extension transmitter, and a host system. The extension solutions are commonly known as "KVM" (keyboard, video, mouse) extensions. A typical example for use of KVM extension solutions are remote trading solutions, i.e., when stock traders desire to perform remote trading without being required to accommodate a large number of host computer systems under their desk on the trading floor. The three major components used in remote trading solutions are a manageability switch, a transmitter/receiver pair, and a multi system switch. Each of these components are modular and can be used alone or in any combination. The KVM extension mode of operation typically supports user I/O protocols, sometimes referred to as "legacy" protocols, such as PS/2, analog video, and serial.

Many other problems and disadvantages of the prior art will become apparent to one skilled in the art after comparing such prior art with the present invention as described herein.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating certain embodiments of the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
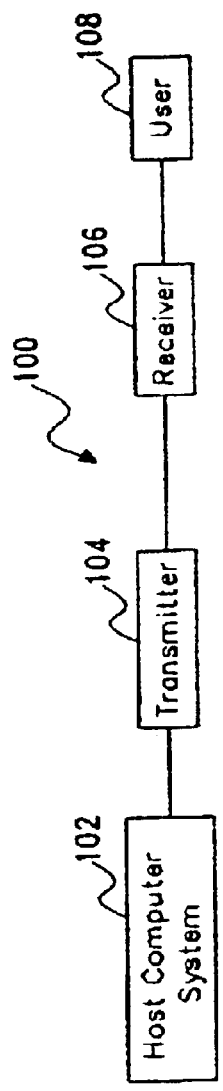
FIG. 1 is a block diagram of a basic computer interface extension solution according to embodiments of the present invention.

Various aspects of the present invention are realized through a KVM extension configuration that includes a host connected to a transmitter for transmitting communication signals across an extension to a receiver where user interface devices are located. The host has a motherboard that supports USB communications. A USB adapter is coupled to the transmitter that converts USB signals that the transmitter receives from the host to a non-USB format prior to transmission across the extension to the receiver where the user interface devices successfully communicate with the host. A transmitter core is coupled to the transmitter that receives the non-USB signals from the USB adapter and transmits such signals to the receiver.

In certain embodiments, the transmitter of the KVM extension configuration may include a peripheral connection interface graphics controller that communicates with the motherboard independent of the USB signals of the host. The transmitter sometime includes an accelerated graphics port controller that communicates with the motherboard independent of the USB signals of the host. The user interface devices are often a keyboard, a mouse, a video monitor, a speaker, a serial link, a power button, and a microphone. In some embodiments, the receiver is extensibly connected to the transmitter via a fiber optic cable or even a cable compatible with any version of category five or above type cables. Typically, the transmitter is disposed internally to the host and a ribbon cable is disposed between the motherboard and the extension transmitter card to facilitate USB communications therebetween. In some embodiments, the transmitter is disposed internally to the host and, for non-USB communications, communicates with the motherboard of the host via one of a PCI, PCI-X, or AGP interface with the transmitter.

Various aspects of the invention may also be realized in a computer interface extension configuration that includes a host computer system that communicates with an extension transmitter using at least USB communication protocols. A USB adapter is coupled to the extension transmitter that converts USB communication signals that are received from the host computer system into a non-USB format that may be transmitted to an extension receiver located outside of USB operating ranges from the extension transmitter. At least one user interface device is coupled to the extension receiver that communicates with the host computer system through the extension transmitter and the extension receiver.

Variations of this embodiment are apparent when the extension transmitter is disposed internally to the host computer system. Also, the extension transmitter may eliminate the need for legacy cables between the host computer system and the extension transmitter.

Still other aspects of the invention may be realized through a method for extending computer interface communications between a host computer and a plurality of computer interface devices. The method involves, not necessarily in this order, electrically connecting an extension transmitter card to a slot in the host computer system. The extension transmitter card includes an extension transmitter device having a USB component with a host controller to support USB communications with a USB adapter on the extension transmitter card. The method also involves electrically connecting a motherboard header of the extension transmitter card to a connector on the host that is separate from the slot in the host with which the extension transmitter card is electrically connected; converting USB communications from the host to a non-USB format with the USB adapter of the extension transmitter card; and transmitting communications from the extension transmitter card to an extension receiver to complete operations with at least one of the plurality of computer interface devices.

In certain embodiments of the invention, the method of transmitting communications from the extension transmitter card includes transmitting the non-USB format communications from the USB adapter. The method of transmitting communications from the extension transmitter card may also involve receiving the non-USB format communications at the extension receiver for communicating with at least one of the plurality of computer interface devices.

FIG. 1 is a block diagram of a basic computer interface extension solution 100 in accordance with embodiments of the present invention. The solution 100 is illustrated as having a host computer system 102 that communicates, in certain embodiments, with an extension transmitter 104 (herein referred to as "transmitter") via USB protocol. The transmitter 104 includes USB adapters (not shown) to fully support all USB communications between the transmitter 104 and the computer system 102. The transmitter 104 is connected to the extension receiver 106 (herein referred to as "receiver") which is connected to a user 108. The user 108 is representative of standard user (or legacy) interface products such as a keyboard, mouse, monitor, serial port, audio devices, etc. The USB adapter(s) introduced at the transmitter 104 convert the USB signals to a non-USB format prior to transmission of the signals from the transmitter 104 to the receiver 106. Thus, the computer system 102 communicates with USB protocols and eliminates the need for legacy cables between the computer system 102 and the transmitter 104. Although data travels bi-directionally between the host computer system 102 and the user 108, to delineate the separation, the transmitter 104 and the receiver 106 are labeled as though data transfer occurs only in one direction, i.e., from the host computer system 102 to the user 108.

The transmitter 104 and receiver 106 are connected with a single cable such as a cable compatible with all versions of category 5, 6, 7, or better cables. The connection could also be made with fiber optic or other type of high speed data transmission cabling. The distance between the transmitter 104 and receiver 106 ranges approximately 300 meters. In this manner are the user interface devices of the user 108 allowed to communicate effectively with the host computer system 102 across long distances, "long" as compared to user/host communication distances in a system without the transmitter 104/receiver 106 pair. Although illustrated external to the host 102, the transmitter 104 may be positioned internal to the host computer system 102 and use an internal connector with the motherboard of the system 102 (see FIG. 4).

Figure 2:
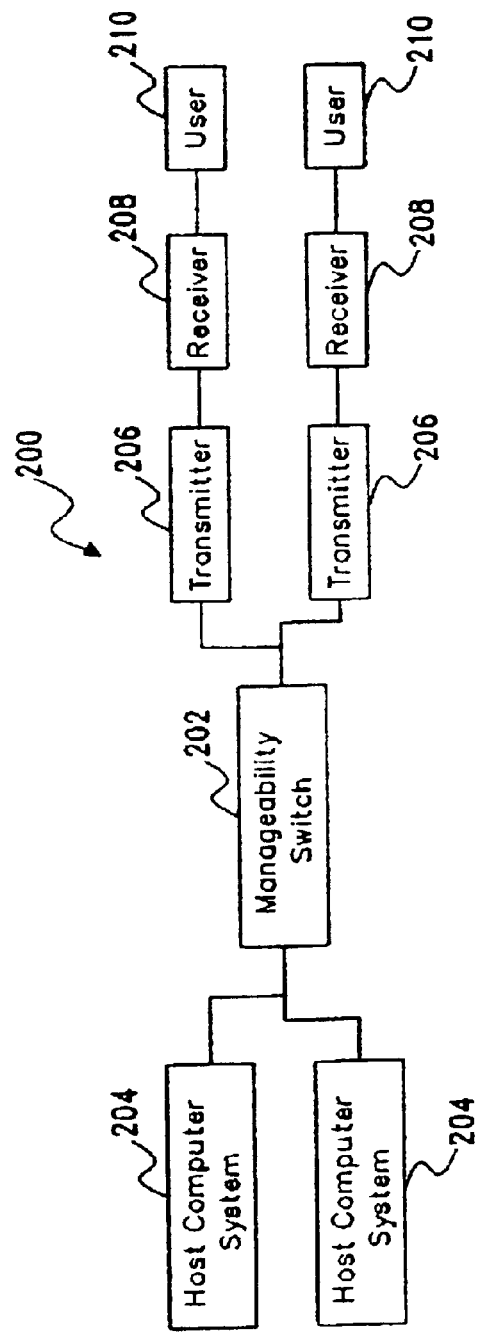
FIG. 2 is a block diagram of another basic computer interface extension solution wherein a manageability switch is introduced into the solution in accordance with embodiments.

FIG. 2 is a block diagram of another basic computer interface extension solution 200 wherein a manageability switch 202 is introduced into the solution. The solution 200 includes multiple host computer systems 204, multiple transmitters 206, and multiple receivers 208 that support the communication extension for multiple users 210. The manageability switch 202 encompasses technology used to map a specific user to a specific system, to converge a large number of systems to a small number of users for system administration or head trader access, and to share a single system between two or more users.

Figure 3:
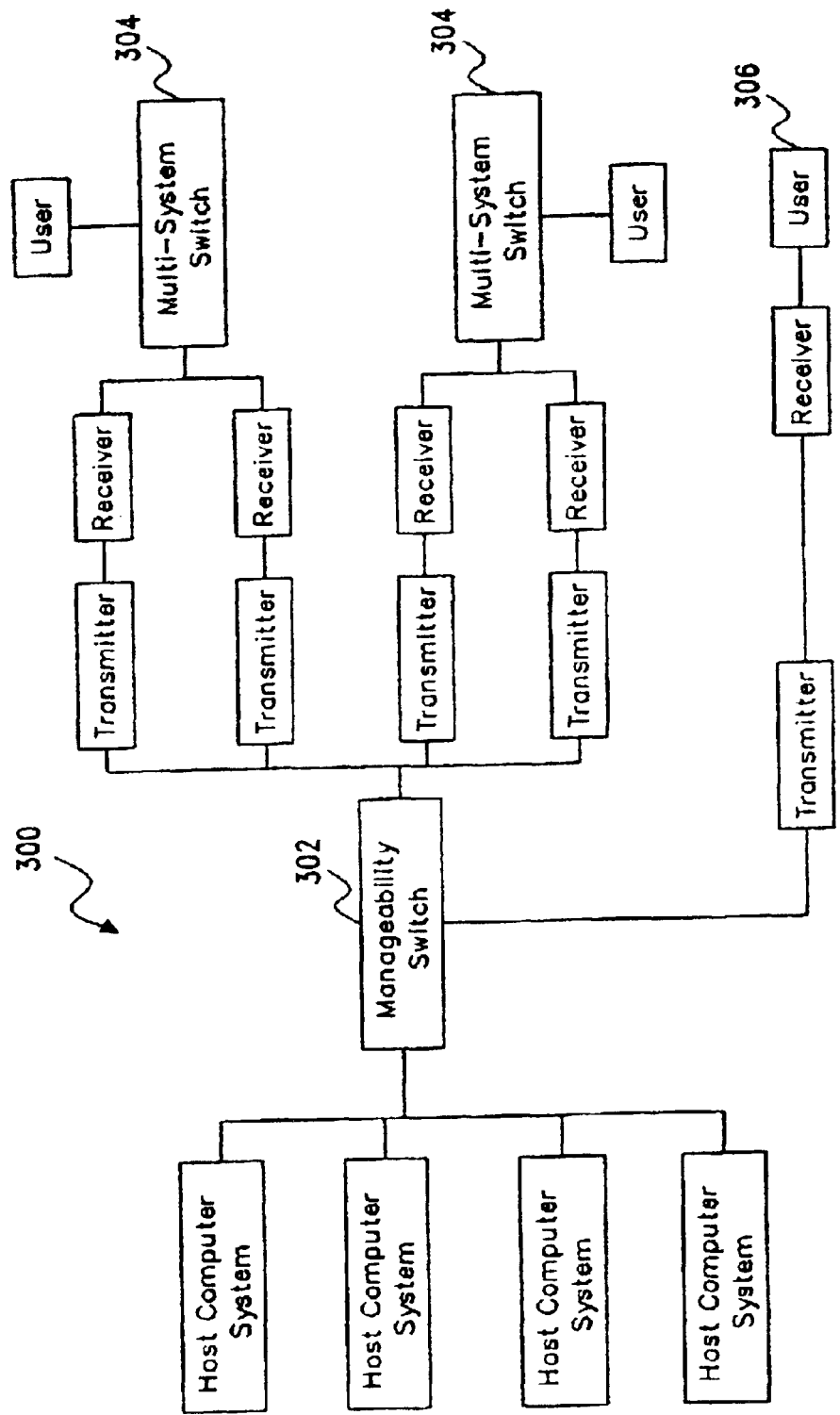
FIG. 3 is a block diagram of a computer interface extension solution wherein a manageability switch and multi-system switches are introduced into the solution in accordance with embodiments.

FIG. 3 is a block diagram of a computer interface extension solution 300 wherein a manageability switch 302 and multi-system switches 304 are introduced into the solution 300. An administrative user 306 is also illustrated that provides the capability to monitor the users 304 and make adjustments to the solution 300 configuration if necessary.

Figure 4:
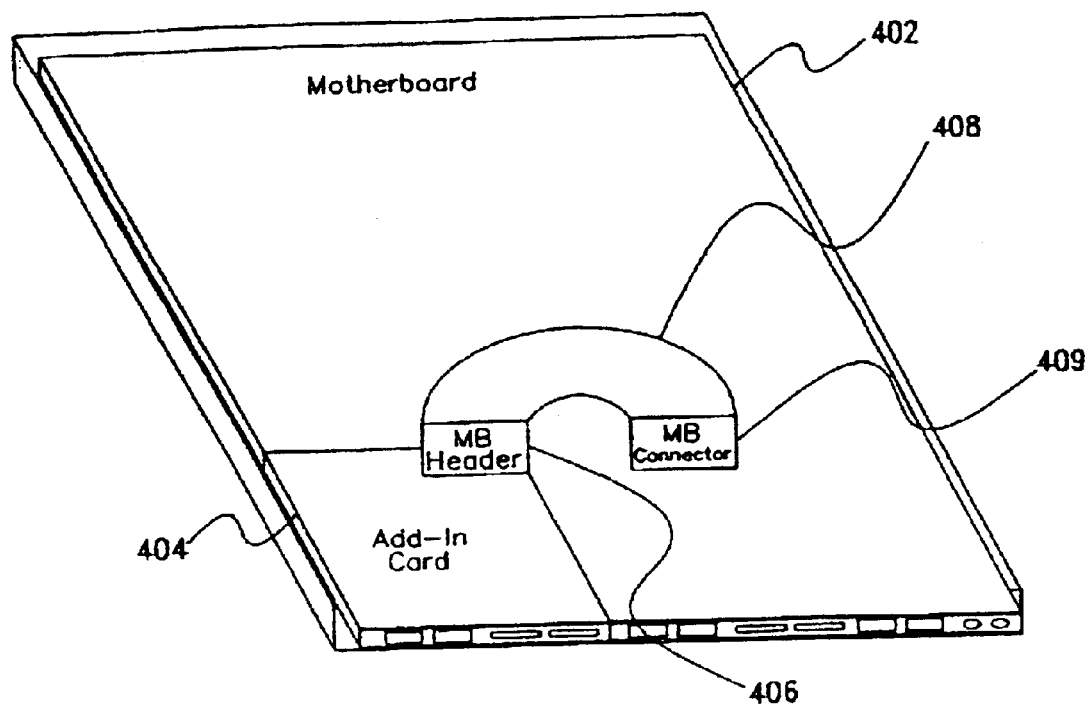
FIG. 4 is a simplified diagram of a motherboard having an add-in card that allows communications with the motherboard in accordance with embodiments.

FIG. 4 is a simplified diagram of a motherboard 402 having an add-in card 404 that allows communications with the motherboard 402 according to principles of the present invention. The add-in card 404 is configured to operate as a transmitter in an extension solution such as a KVM extension solution. However, the add-in card 404 is not limited to KVM connections, but allows for power button, USB, and other connection types. Motherboard (MB) header 406, when connected by a cable 408 such as a ribbon cable to MB connector 409, allows the motherboard 402 to communicate directly with the add-in card 404 rather than only through an external connection between the motherboard 402 and the add-in card 404. This configuration eliminates the need for additional cables to be added externally to the host to communicate between the motherboard 402 and the add-in card 404, which is particularly desirable when the motherboard 402 is one of many motherboards in a rack mounted computer system.

As illustrated in the following figures, the add-in card 404 has various configurations for operation as a transmitter card.

Figure 5:
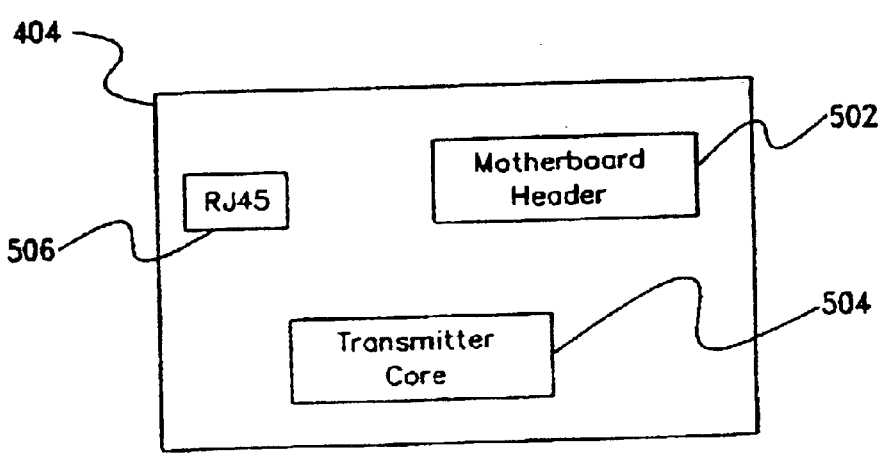
FIG. 5 is a block diagram of one configuration for the add-in card of FIG. 4.

FIG. 5 is a block diagram of one configuration for the add-in card 404. The add-in card 404 is configured with minimal circuitry components such that the motherboard performs most functions of the computer system. A motherboard header 502 acts as the primary interface with the motherboard and the functionality data of the motherboard is passed to a transmitter core 504 via the motherboard header 502 where the data is configured to be transmitted at a connector such as RJ-45 connector 506. In the illustrated embodiment, motherboard functionality data that is passed directly to the add-in card 404 commonly includes functions such as PS/2 mouse, PS/2 keyboard, USB 1.1 or 2.0, power button, card power, cable detect, analog video, digital video, analog audio, and RS-232 serial.

All functions can be included or excluded in the cable 408 definition as needed. For example, when RS-232 serial, digital and analog video, and audio functions are included in the functions, switching should occur on the motherboard to avoid conflicts and select between functional connectors on the motherboard and the add-in card 404. The add-in card 404 of FIG. 5 is considered to be a "dumb" card because the functionality is realized on the motherboard and passed to the add-in card 404 across the cable 408.

Figure 6:
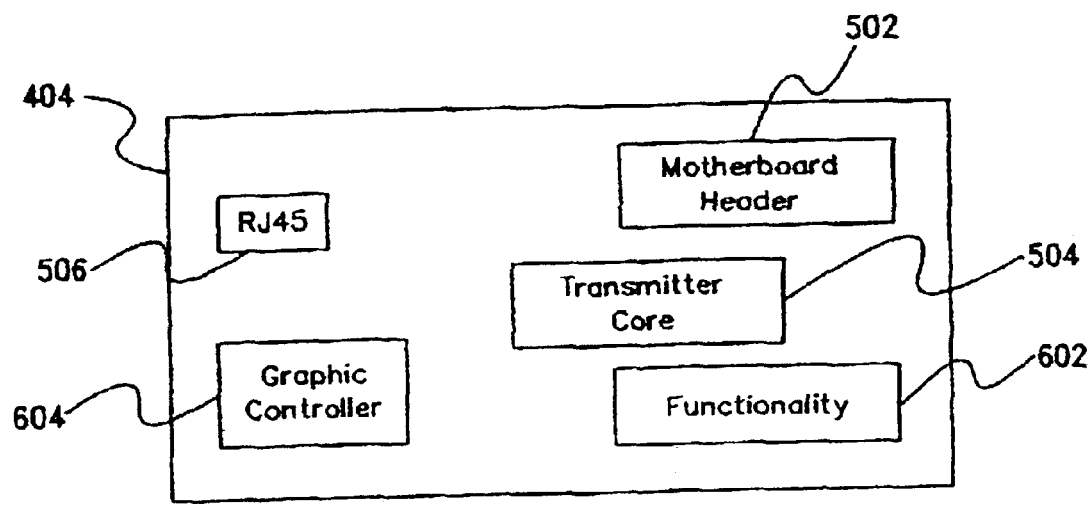
FIG. 6 is a block diagram of a second configuration for the add-in card of FIG. 4.

FIG. 6 is a block diagram of a second configuration for the add-in card 404. This configuration introduces functionality from the motherboard represented by functionality 602. The functionality 602 is flexible in that various degrees of motherboard functionality may be realized on the add-in card 404 itself, rather than on the motherboard and then transferred to the add-in card 404. In addition, a graphic controller 604 is included on the add-in card 404 for at least the reason that a slot may be opened on the motherboard. The graphic controller 604 may be compatible with PCI, AGP, or other protocol. For example, if the graphic controller 604 is PCI compatible, the add-in card 404 would be considered a PCI card and would plug into an available PCI slot while using the motherboard header 504 to communicate with other motherboard functionality that is not included in the functionality 602. Thus, an internal transmitter can be incorporated onto the motherboard without giving up an additional PCI slot on the motherboard. In one embodiment, functionality is supported to convert USB communications to a PS/2-legacy type of protocol that is recognized by the extension receiver as the data is passed from the RJ-45 connector 506 of the transmitter add-in card 404.

Figure 7:
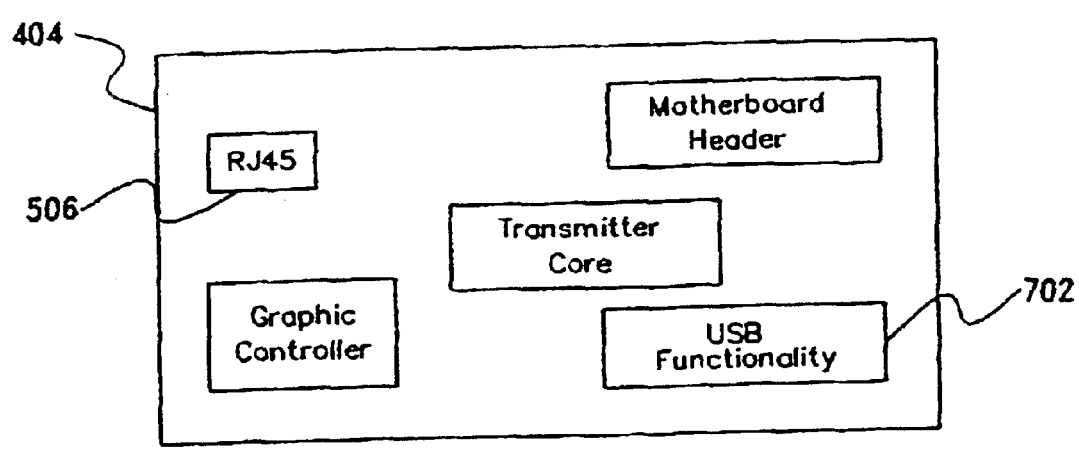
FIG. 7 is a block diagram of a third configuration for the add-in card of FIG. 4.

FIG. 7 is a block diagram of a third configuration for the add-in card 404. A USB functionality component 702 is introduced such that the add-in card 404 operates with a USB protocol to support USB devices such as a keyboard and mouse. The USB functionality component 702 may include the USB host controller for USB communications with the motherboard 402. An adapter is included in the USB functionality component 702 to convert USB signals to a non-USB format for transmission from the RJ-45 connector 506 across the extension. The adapter allows transmission of the non-USB formatted data to occur over the extension while continuing to comply with the local USB communication protocol with the motherboard 402.

Of course, the USB functionality component 702 is exemplary of the different types of functions that may be implemented on the add-in card 404 rather than on the motherboard. For example, the functionality could include audio in/out signals and serial RS-232 protocols. One additional possibility is that the functionality 702 could include the capability to allow the computer system to recognize that the add-in card 404 is present in a computer thereby enabling enumeration of such add-in card 404.

When the computer system recognizes the add-in card 404, the functionality on the add-in card 404 is detected by the motherboard 402 and the functionality is also identified by the motherboard 402 to assist in driver selection for software programs that use the particular functionality while operating. USB functionality is supported through endpoint configuration, i.e., endpoint registers and descriptors. For example, a certain collection of endpoints may indicate that a KVM transmitter device is present on the add-in card 404. Other collections of endpoints indicate KVM devices other than the above noted KVM transmitter device.

Figure 8:
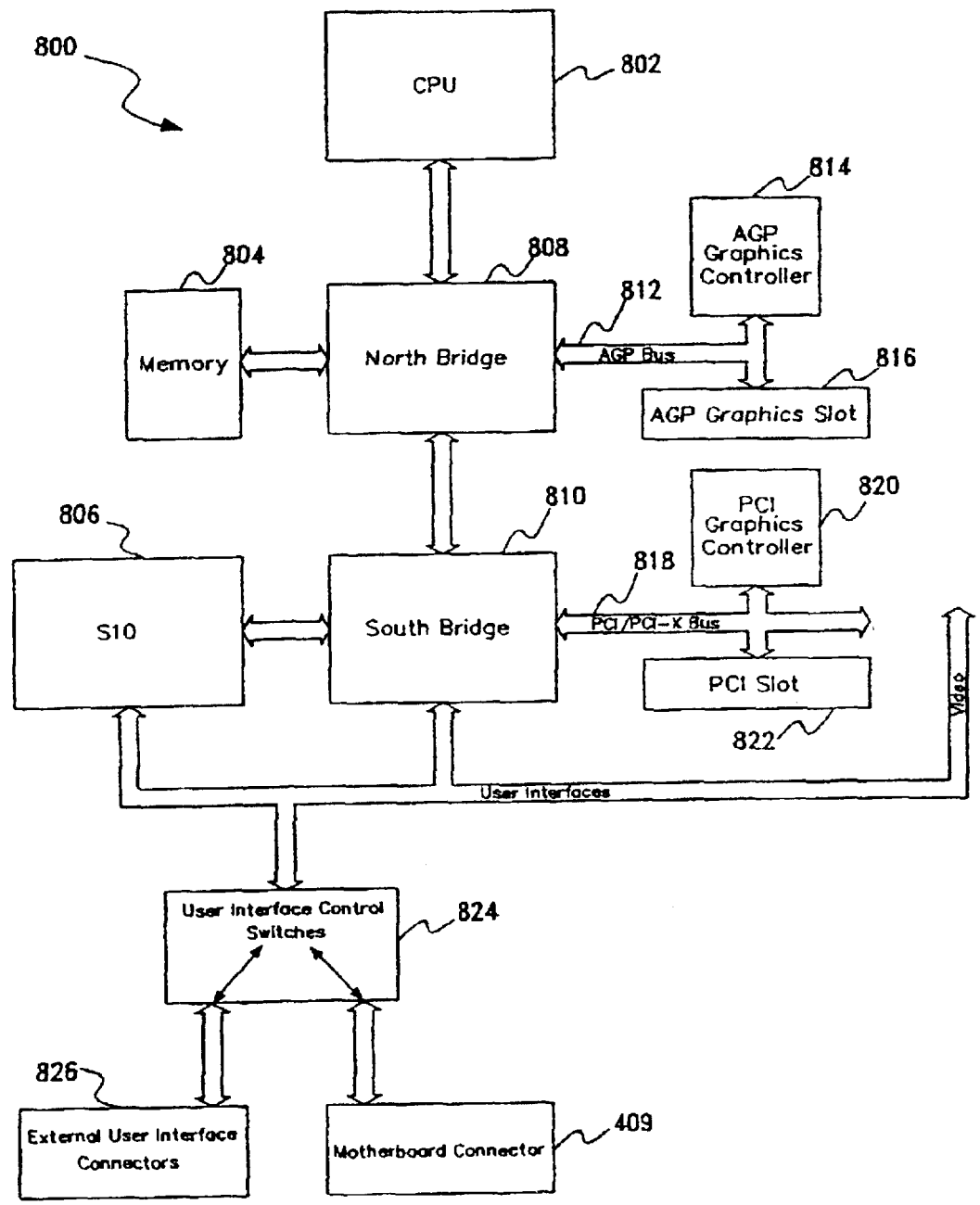
FIG. 8 is a block diagram of a host computer system motherboard configuration in accordance with embodiments.

FIG. 8 is a block diagram of a host computer system motherboard configuration 800 according to principles of the present invention. A processor (CPU) 802, memory 804, and super I/O (SIO) 806 are illustrated to show motherboard communications across a north bridge 808 and a south bridge 810. The north bridge 808 provides an AGP bus 812 for AGP communications with either an AGP graphics controller 814 on the motherboard 800 or an AGP graphics slot 816 with an AGP graphics card (not shown) inserted. The AGP graphics card is a card such as the add-in card 404 with a graphic controller (e.g., graphic controller 604) compatible with AGP graphics communications.

The south bridge 810 provides a PCI/PCI-X bus 818 for PCI/PCI-X communications with either a PCI graphics controller 820 on the motherboard 800 or a PCI slot 822 with a PCI graphics card (not shown) inserted. The PCI graphics card is a card such as the add-in card 404 with a graphic controller (e.g. graphic controller 604) configured for PCI graphics communications.

The north bridge 808/south bridge 810 configuration allows one graphic controller to be enabled at a time. For example, if an AGP graphics controller 814 exists on the north bridge 808, then there will be no other graphic controller. Alternatively, if a PCI graphics controller 820 exists on the south bridge 810, then no other graphic controller is operational on the motherboard 800. Of note, the PCI slot 822 is representative of many slots that support PCI cards in general, not just a PCI graphics controller card. In other words, the add-in card 404 could have a PCI graphics controller and be inserted into the PCI slot 822 while other PCI cards are inserted into other PCI slots to communicate with the south bridge 810. Alternatively, the north bridge 808 may have an AGP graphics controller installed (either directly on the motherboard 800 or inserted in the AGP graphics slot 816) and non-graphic PCI communications may occur on the south bridge 810.

Significantly, as discussed above, the add-in card 404 has a motherboard header 406 for connecting directly to the motherboard connector 409. A user interface control 824 manages communications among the motherboard 800, the motherboard connector 409, and external user interface connections 826.

Figure 9A:
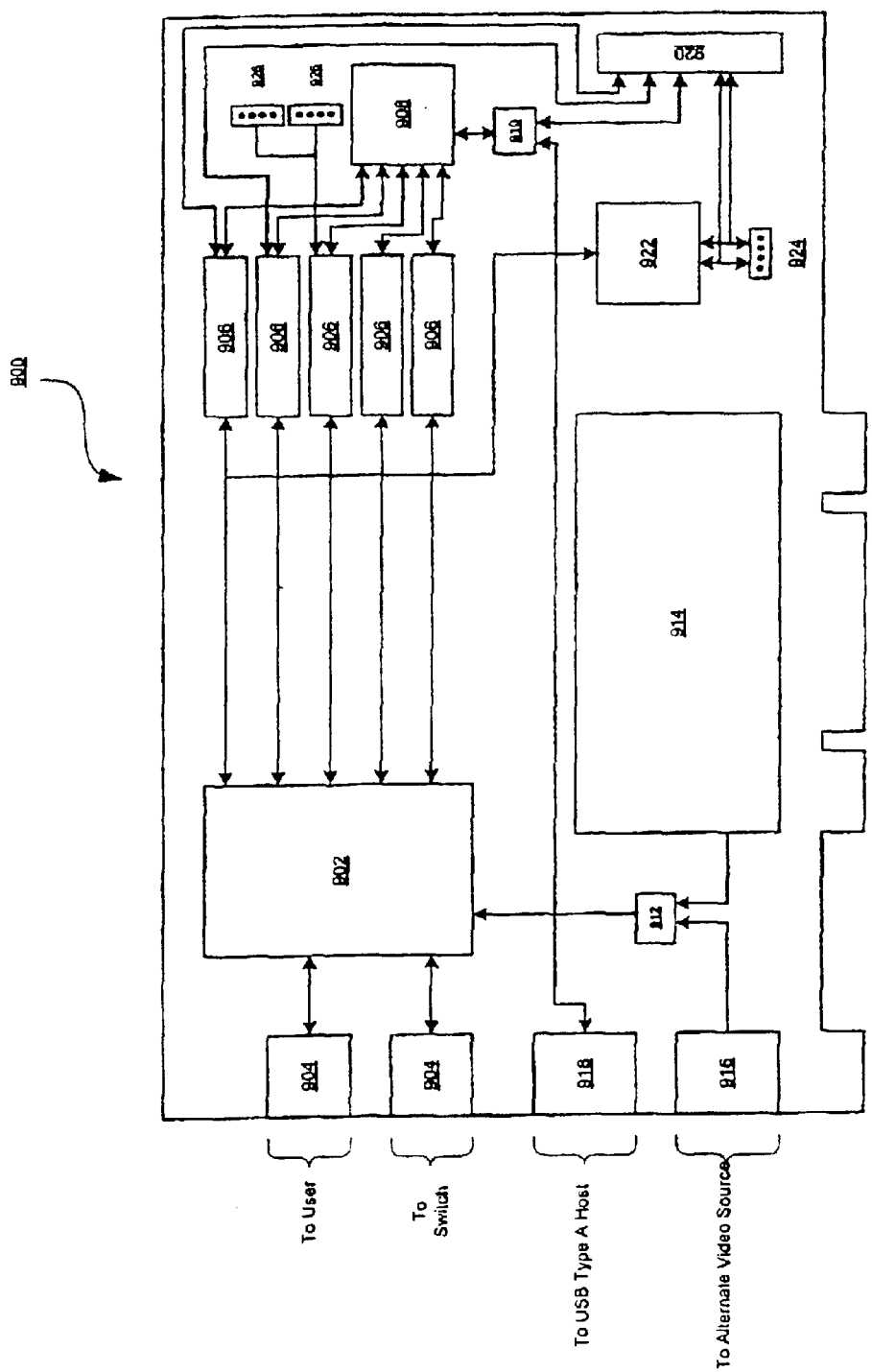
FIG. 9A is a block diagram of an exemplary transmitter configuration in accordance with embodiments.

FIG. 9A is a block diagram of an exemplary transmitter configuration 900 according to principles of the present invention. The transmitter configuration 900 includes a transmitter core 902 that is electrically coupled to transmitter access points 904. As illustrated, the transmitter access points 904 link to a user and to a switch. Among other things, the access points 904 may be RJ45 sockets.

USB adapters 906 are provided wherein USB communications from the host may be converted to a non-USB format prior to transmission across the extension to the user. For example, USB adapters 906 may be USB keyboard to PS/2, USB mouse to PS/2, USB audio to analog, USB serial to RS232, etc. Of course, the USB adapters 906 operate bi-directionally and convert non-USB communications into USB format to be recognized by a host computer system. A USB device 908 operates in conjunction with the USB adapters 906.

Switches 910 and 912 are configured to designate explicit functionality of the transmitter configuration 900. For example, the switch 912 allows the transmitter core 902 to transmit signals from either a PCI graphic controller 914 of the transmitter configuration 900 or from an alternate video source that transmits signals to the transmitter core 916 through a VGA port 916. On the other hand, the switch 910 permits signals to pass from a USB port 918 and the USB device 908, or from a motherboard header 920 to the USB device 908. The motherboard header 920 provides capability for the transmitter configuration 900 to operate directly with a motherboard via an internal cable connected between the motherboard header 920 and the motherboard. Alternatively, an external cable could be present between the USB port 18 and the motherboard. The switch 910 may be set to select the desired communication path, i.e., internal or external cabling.

Additional functionality such as a power button control 922 are illustrated. in the transmitter configuration 900. The power button control 922 operates according to settings that it reads from a power button 924. Also illustrated are CD and auxiliary audio components 926 that may operate in connection with the USB adapters 906 such as a USB audio to analog adapter.

Figure 9B:
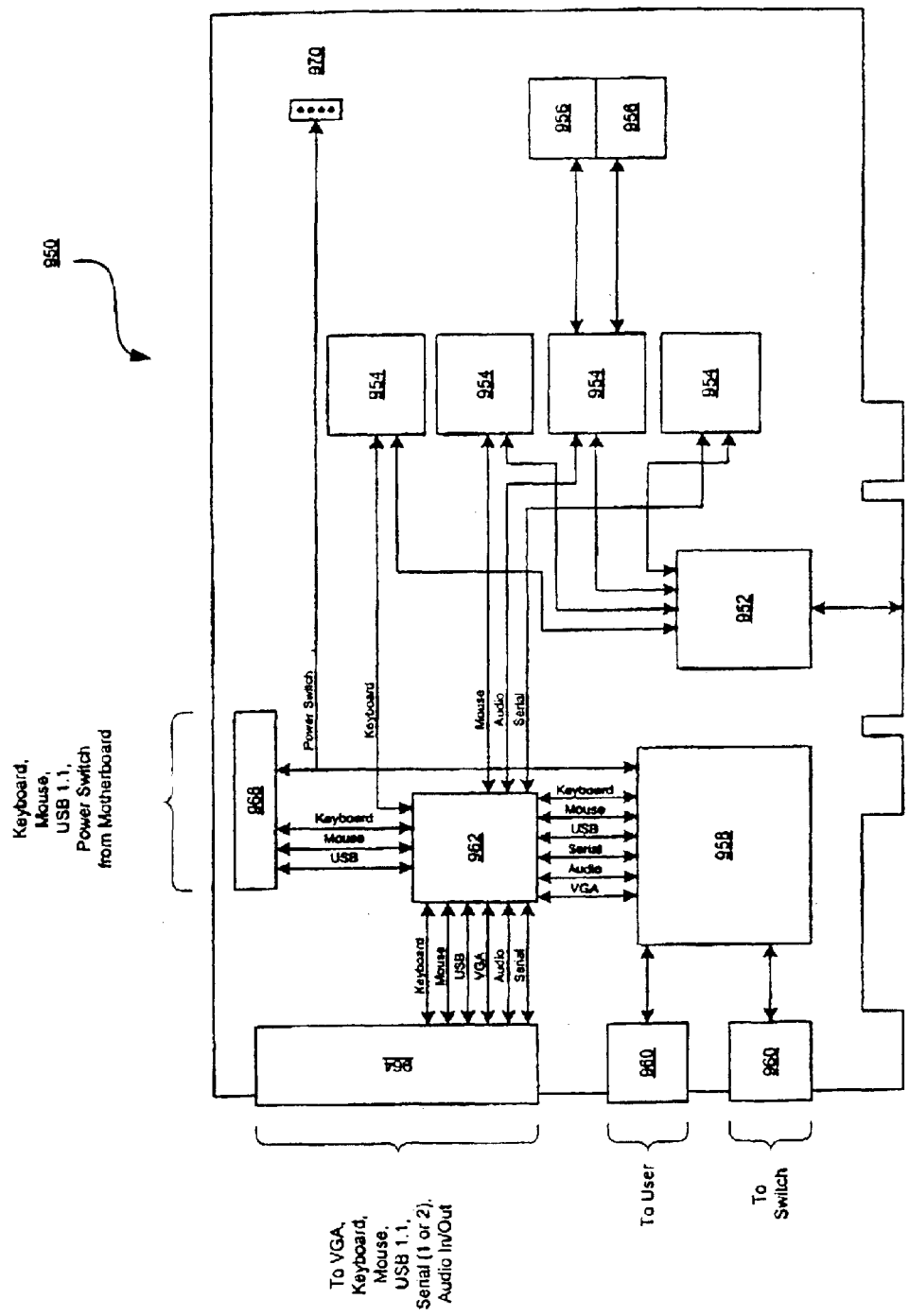
FIG. 9B is a block diagram of yet another exemplary embodiment of a transmitter configuration in accordance with embodiments.

FIG. 9B is a block diagram of yet another exemplary embodiment of a transmitter configuration 950. The transmitter configuration 950 includes a PCI USB host controller 952 that operates according to signals that it receives from USB adapters 954. Similar to the USB adapters 906, the USB adapters 954 may include a keyboard adapter, a mouse adapter, a serial adapter, and an audio adapter with audio plugs 956 for CD and auxiliary connections.

A KVM extension controller 958 is illustrated where management decisions are made concerning signal transmissions across ports 960. The ports 960 support communications to and from a user and/or switch using components familiar to those of ordinary skill in the art, e.g., the ports 960 may be RJ45 connections. The KVM extension controller 958 also receives communication signals from a switch 962. The switch 962 forwards/receives communications through either an external cable or an internal cable. A port 964 is configured for communications with external interfaces across the external cable while port 966 communicates with the external devices across the internal cable. A power switch connector 970 may also be provided in the transmitter configuration 950 to control operations of the KVM extension controller 958.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A KVM extension configuration comprising:
   a host having a motherboard that supports USB and non-USB communications; and
   an extension transmitter card assembly internal to the host and in communication with the motherboard, the card assembly comprising:
      a USB adapter to convert USB signals received from the motherboard to a non-USB format; and
      a transmitter core coupled to the USB adapter to receive the non-USB signals from the USB adapter and transmit such signals across an extension to a receiver for receipt by user interface devices.

2. The KVM extension configuration of claim 1 wherein the extension transmitter card assembly includes a peripheral connection interface graphics controller that communicates with the motherboard independent of the USB signals of the host.

3. The KVM extension configuration of claim 1 wherein the extension transmitter card assembly comprises an accelerated graphics port controller that communicates with the motherboard independent of the USB signals of the host.

4. The KVM extension configuration of claim 1 wherein the user interface devices comprise a keyboard, a mouse, a video monitor, a speaker, a serial link, a power button, and a microphone.

5. The KVM extension configuration of claim 1 wherein the receiver is extensibly connected to the extension transmitter card assembly via a fiber optic cable.

6. The KVM extension configuration of claim 1 wherein the receiver is extensibly connected to the extension transmitter card assembly via a cable that supports at least the transmission characteristics that are supported by any version of a category five type cable.

7. The KVM extension configuration of claim 1 wherein the transmitter is disposed internally to the host and a ribbon cable is disposed between the motherboard and the extension transmitter card to facilitate USB communications therebetween.

8. The KVM extension configuration of claim 1 wherein, for non-USB communications, the extension transmitter card assembly communicates with the motherboard of the host via a PCI, PCI-X, or AGP interface.

9. A method for extending computer interface communications between a host computer and a plurality of computer interface devices comprising:
   inserting an extension transmitter card in a slot in the host computer system, the extension transmitter card including an extension transmitter device having a USB component with a host controller to support USB communications with a USB adapter on the extension transmitter card;
   electrically connecting a motherboard header of the extension transmitter card to a connector on the host that is separate from the slot in the host in which the extension transmitter card is inserted;
   converting USB communications from the host to a non-USB format with the USB adapter of the extension transmitter card; and
   transmitting communications from the extension transmitter card to an extension receiver to complete operations with at least one of the plurality of computer interface devices.

10. The method of claim 9 wherein said transmitting communications from the extension transmitter card comprises transmitting the non-USB format communications from the USB adapter.

11. The method of claim 9 wherein said transmitting communications from the extension transmitter card comprises receiving the non-USB format communications at the extension receiver for communicating with at least one of the plurality of computer interface devices.

12. A computer interface extension configuration comprising:
   a host having a motherboard that supports USB connections; and
   a card assembly internal to the host and in communication with the motherboard, the card assembly comprising:
      a first electrical connector;

a USB adapter to convert USB signals received from the motherboard via the first electrical connector to a non-USB format;

a transmitter circuit coupled to the USB adapter to transmit the converted USB signals across an extension to a receiver for receipt by a user interface device;

a second electrical connector independent of the first electrical connector; and a graphics controller that communicates with the motherboard via the second electrical connector and that transmits graphics signals to the transmitter circuit for transmission across the extension for receipt by a user interface device.

13. The computer interface extension configuration as recited in claim 12, wherein the card assembly comprises:

a third electrical connector; and a switch module coupled to the third electrical connector, the transmitter circuit and the graphics controller, the switch module configured to selectively transmit to the transmitter circuit either graphics signals received from the graphics controller or graphics signals received via the third electrical connector.

14. The computer interface extension configuration as recited in claim 13, wherein the graphics controller comprises either PCI circuitry, PCI transmitter circuitry or AGP circuitry.

15. The computer interface extension configuration as recited in claim 12, wherein the transmitter circuit is configured to transmit the converted USB signals and the graphics signals across a fiber optic cable.

16. The computer interface extension configuration as recited in claim 12, wherein the transmitter circuit is configured to transmit the converted USB signals and the graphics signals across a category 5 cable.

17. The computer interface extension configuration as recited in claim 12, wherein the transmitter circuit comprises KVM extension circuitry.

18. The computer interface extension configuration as recited in claim 12, comprising an expansion slot in communication with the motherboard, wherein the second electrical connector of the card assembly is inserted in the expansion slot.

\* \* \* \* \*